(12) United States Patent
Eguchi

(10) Patent No.: US 10,440,226 B2
(45) Date of Patent: Oct. 8, 2019

(54) IMAGE PROCESSING APPARATUS, CONTROL METHOD OF IMAGE PROCESSING APPARATUS, AND STORAGE MEDIUM WITH PERFORMING SMOOTHING ON OBJECT OTHER THAN CHARACTER

(71) Applicant: CANON KABUSHIKI KAISHA, Tokyo (JP)

(72) Inventor: Kimimori Eguchi, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/181,505

(22) Filed: Jun. 14, 2016

(65) Prior Publication Data

US 2016/0381249 A1    Dec. 29, 2016

(30) Foreign Application Priority Data

Jun. 24, 2015    (JP) .................................. 2015-126477

(51) Int. Cl.
  *H04N 1/409*    (2006.01)
  *H04N 1/405*    (2006.01)
  *H04N 1/58*     (2006.01)
  *H04N 1/60*     (2006.01)

(52) U.S. Cl.
  CPC ........... *H04N 1/4092* (2013.01); *H04N 1/405* (2013.01); *H04N 1/58* (2013.01); *H04N 1/6027* (2013.01); *H04N 2201/02493* (2013.01)

(58) Field of Classification Search
  None
  See application file for complete search history.

(56) References Cited

U.S. PATENT DOCUMENTS

| 8,045,230 B2 | 10/2011 | Matsuoka |
| 9,332,141 B2 | 5/2016 | Eguchi |
| 9,521,281 B2 | 12/2016 | Gotoh |
| 2003/0081831 A1* | 5/2003 | Fukao ................. H04N 1/6025 382/167 |

(Continued)

FOREIGN PATENT DOCUMENTS

| CN | 1503562 A | 6/2004 |
| CN | 101662563 A | 3/2010 |

(Continued)

OTHER PUBLICATIONS

Jul. 24, 2018 Chinese Office Action in Chinese Patent Appln. No. 201610453427.6.

(Continued)

*Primary Examiner* — Thomas D Lee
(74) *Attorney, Agent, or Firm* — Venable LLP

(57) ABSTRACT

A favorable image for which an attribute of each object being taken into consideration is obtained without the need to specify in detail various kinds of image processing to be applied to image data. An image processing apparatus including: an image processing unit configured to perform predetermined image processing on image data; a user interface for a user to set contents of the image processing; and a setting management unit configured to limit a portion of the image data to which the set contents of the image processing are applied in accordance with the contents set via the user interface.

18 Claims, 16 Drawing Sheets

(56) References Cited

U.S. PATENT DOCUMENTS

| | | | |
|---|---|---|---|
| 2004/0151397 A1* | 8/2004 | Hashimoto | G06T 5/20 |
| | | | 382/260 |
| 2007/0146754 A1* | 6/2007 | Chang | H04N 1/52 |
| | | | 358/1.9 |
| 2009/0141310 A1 | 6/2009 | Matsuoka | |
| 2009/0196524 A1* | 8/2009 | Godin | G06T 5/004 |
| | | | 382/263 |
| 2009/0213396 A1* | 8/2009 | Togami | H04N 1/3875 |
| | | | 358/1.9 |
| 2010/0054598 A1 | 3/2010 | Gotoh | |
| 2010/0253702 A1 | 10/2010 | Gotoh | |
| 2013/0235087 A1 | 9/2013 | Kashibuchi et al. | |
| 2013/0271455 A1* | 10/2013 | Tsujita | A61B 8/0866 |
| | | | 345/419 |

FOREIGN PATENT DOCUMENTS

| | | |
|---|---|---|
| CN | 101867684 A | 10/2010 |
| CN | 103338707 A | 10/2013 |
| JP | H10-004494 A | 1/1998 |
| JP | 3176341 B2 | 6/2001 |
| JP | 2005-204263 A | 7/2005 |
| JP | 2009135796 A | 6/2009 |
| JP | 2013-190870 A | 9/2013 |

OTHER PUBLICATIONS

Jan. 29, 2019 Japanese Official Action in Japanese Patent Appln. No. 2015-126477.

Apr. 11, 2019 Chinese Official Action in Chinese Patent Appln. No. 201610453427.6.

\* cited by examiner

| i-1,j-1 | i,j-1 | i+1,j-1 |
| --- | --- | --- |
| i-1,j | i,j | i+1,j |
| i-1,j+1 | i,j+1 | i+1,j+1 |

FIG.5A

| 0 (501) | -1 (502) | 0 (503) |
| --- | --- | --- |
| -1 (504) | 5 | -1 (505/506) |
| 0 (507) | -1 (508) | 0 (509) |

FIG.5B

| 1 | 1 | 1 |
| --- | --- | --- |
| 1 | 5 | 1 |
| 1 | 1 | 1 |

FIG.5C

IMAGE PROCESSING APPARATUS, CONTROL METHOD OF IMAGE PROCESSING APPARATUS, AND STORAGE MEDIUM WITH PERFORMING SMOOTHING ON OBJECT OTHER THAN CHARACTER

BACKGROUND OF THE INVENTION

Field of the Invention

The present invention relates to control of filter processing for image data.

Description of the Related Art

There are a variety of aspects for a user interface (UI) in the case where a user uses various functions included in an image forming apparatus. For example, in the case where a certain function is provided via a UI that can be used with a simple setting, it is possible for a user to use the function without performing a complicated operation. On the other hand, in the case where a certain function is provided via a UI that is used after performing a detailed setting, it is possible for a user to give detailed instructions so that, for example, the function is applied only to a specified portion.

For example, as an example of the UI that allows the use of a function with a simple setting, there is a UI for performing filter processing, such as sharpening and smoothing, on entire image data. In this case, it is possible for a user to enhance the edge of an object within an image by specifying sharpening on the UI and to smooth the contour of an object within an image by specifying smoothing. At this time, the contents of the specified filter processing are applied to the entire image and the single effect is obtained, and therefore, the UI is easy for a user to see. On the other hand, there is a UI with which it is possible to specify the applied-portion of sharpening and smoothing for each object, such as character (text), photo (image), and graphic, within an image, although the UI is similarly one of the UIs for filter processing. With the UI such as this for which a detailed setting is required, for example, it is possible to specify smoothing processing only for a photo to make the photo smooth. Consequently, in the case where it is desired to change the effect of image processing for each object that exists within the same image, the UI such as this is useful. Then, the technique to perform a different setting for each attribute of an object within an image is known conventionally, in addition to the effect of filter processing as described above (e.g., see Japanese Patent Laid-Open No. 2013-190870).

Here, in the case of the UI that can be used with a simple setting, for example, on a condition that smoothing is specified as the effect of filter processing for an image including a photo and a character, the portion of the photo is made smooth, but the portion of the character is dulled, and therefore, the legibility of the character is reduced. On the other hand, in the case of the UI that can be used with a detailed setting, it is necessary to specify the effect of filter processing for each attribute, such as text, image, and graphic, and therefore, this requires time and effort of a user. Further, in this case, there is also such a problem that expertise to determine the object attribute within the image is required.

SUMMARY OF THE INVENTION

An image processing apparatus according to the present invention includes an image processing unit configured to perform predetermined image processing on image data, a user interface for a user to set contents of the image processing, and a setting management unit configured to limit a portion of the image data to which the set contents of the image processing are applied in accordance with the contents set via the user interface.

Further features of the present invention will become apparent from the following description of exemplary embodiments (with reference to the attached drawings).

BRIEF DESCRIPTION OF THE DRAWINGS

FIG. 5A is a diagram showing corresponding pixels in an area (area of interest) on which filter processing is to be performed, FIG. 5B is diagram showing an example of a filter that is used for sharpening processing, and FIG. 5C is a diagram showing an example of a filter that is used for smoothing processing;

DESCRIPTION OF THE EMBODIMENTS

<<General Configuration of System>>

Figure 1:
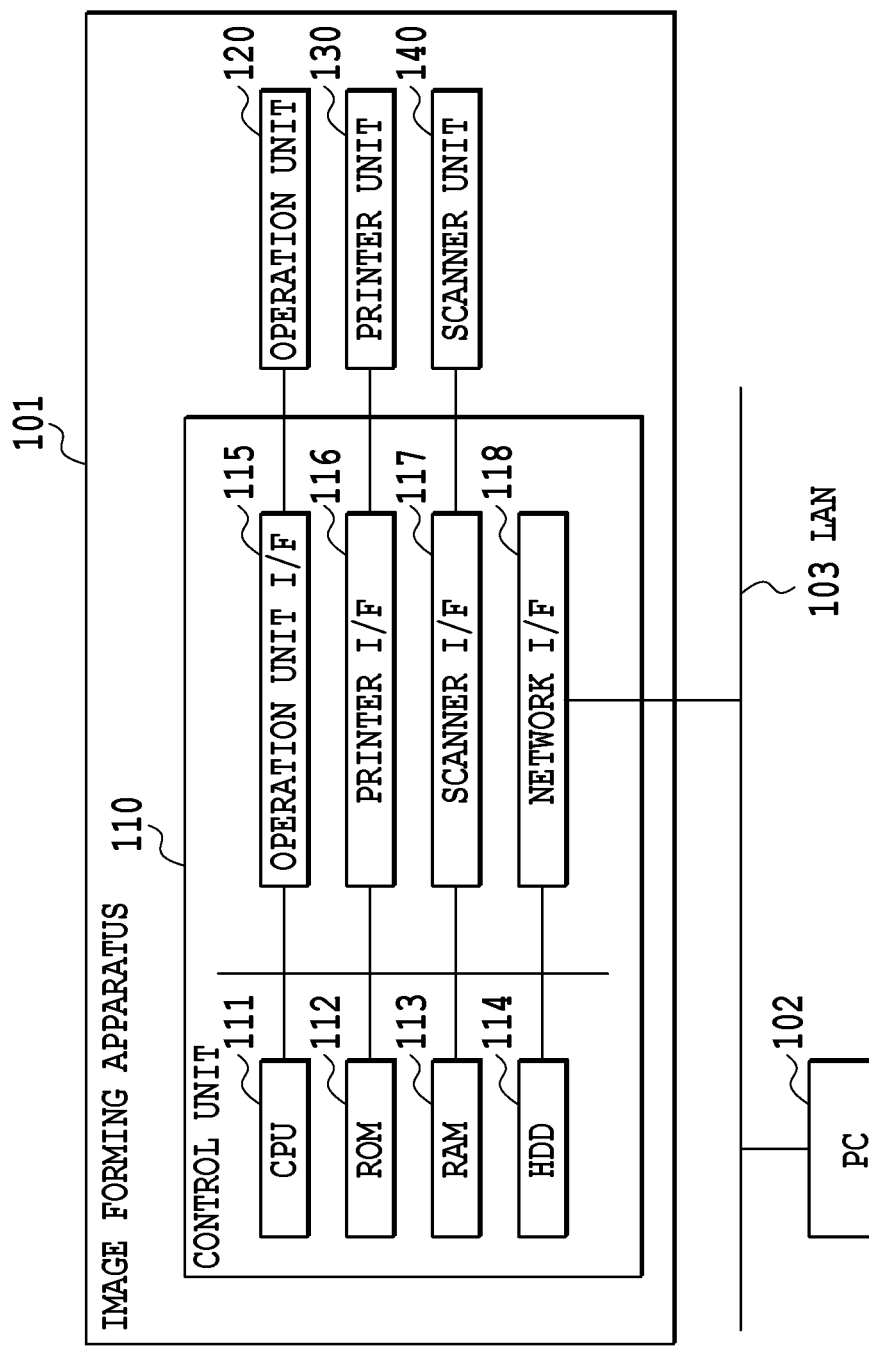
FIG. 1 is a general configuration diagram of a printing system.

FIG. 1 is a general configuration diagram of a printing system according to the present embodiment. A printing system shown in FIG. 1 includes an image forming apparatus 101 and a PC 102, which are connected to each other through a LAN 103. Image data (PDL data) generated in the PC 102 is transmitted to the image forming apparatus 101 through the LAN 103 and is printed and output. Further, FIG. 1 also shows an internal configuration (hardware configuration) of the image forming apparatus 101. Hereinafter, the internal configuration of the image forming apparatus 101 is explained.

A control unit 110 including a CPU 111 controls the operation of the entire image forming apparatus 101. The CPU 111 reads control programs stored in a ROM 112 and performs various kinds of control, such as read control and transmission control. A RAM 113 is used as a main memory and as a temporary storage area, such as a work area, of the CPU 111.

An HDD 114 stores image data, various programs, or various information tables. An operation unit I/F 115 is an interface that connects an operation unit 120 and a control unit 110. The operation unit 120 includes a liquid crystal display having a touch panel function and a keyboard, and is in charge of a user interface function. Further, the operation unit 120 includes a user authentication unit configured to receive an authentication operation in the case where user authentication is performed by using an ID card or the like.

A printer I/F 116 is an interface that connects the printer unit 130 and the control unit 110. Image data to be printed in the printer unit 130 is transferred from the control unit 110 via the printer I/F 116 and is printed on a printing medium, such as paper, in the printer unit 130.

A scanner I/F 117 is an interface that connects a scanner unit 140 and the control unit 110. The scanner unit 140 generates image data by reading an image on a document that is set on a document table or an ADF, not shown schematically, and inputs the image data to the control unit 110 via the scanner I/F 117.

A network I/F 118 is an interface that connects the control unit 110 (image forming apparatus 101) to the LAN 103. The network I/F 118 transmits image data and information to an external device (e.g., cloud service server), not shown schematically, on the LAN 103 and receives various kinds information from the external device on the LAN 103.

<<Software Configuration of Image Forming Apparatus>>

Figure 2:
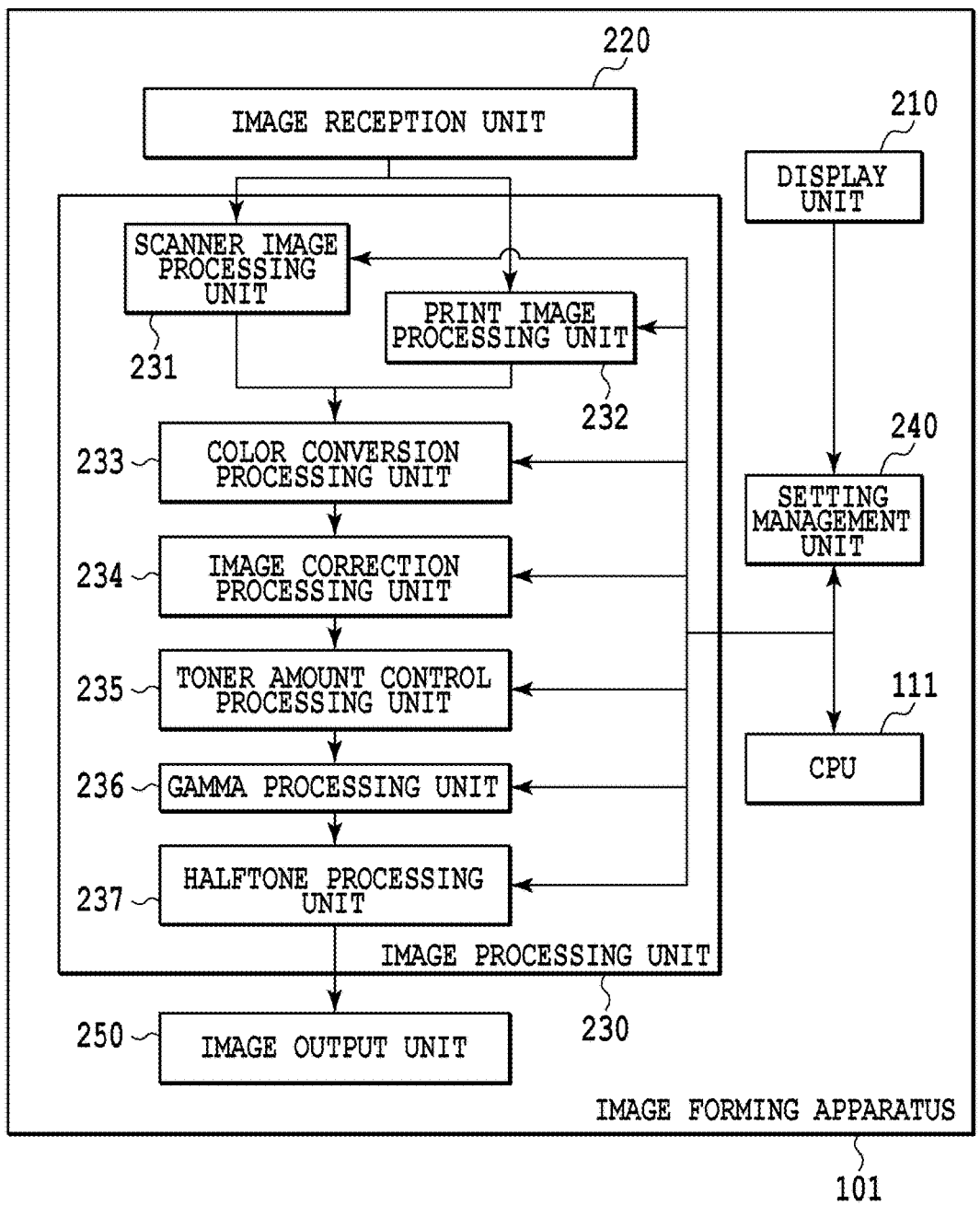
FIG. 2 is a diagram showing an example of a software configuration of an image forming apparatus 101.

FIG. 2 is a diagram showing an example of a software configuration of the image forming apparatus 101. The image forming apparatus 101 includes each function unit of a display unit 210, an image reception unit 220, an image processing unit 230, a setting management unit 240, and an image output unit 250. Each of these function units is implemented by the CPU 111 of the image forming apparatus 101 executing control programs. Hereinafter, each function unit is explained.

The display unit 210 receives various input operations from a user as well as displaying various setting values on a liquid crystal display of the operation unit 120.

The image reception unit 220 receives image data in accordance with each function of the image forming apparatus 101. For example, in the case where the copy function is performed, the image reception unit 220 receives scanned image data from the scanner unit 140 and in the case where the print function is performed, the image reception unit 220 receives PDL data from the PC 102.

The image processing unit 230 performs various kinds of image processing on the image data received by the image reception unit 220. The image processing unit 230 includes a scanner image processing unit 231, a printer image processing unit 232, a color conversion processing unit 233, an image correction processing unit 234, a toner amount control processing unit 235, a gamma processing unit 236, and a halftone processing unit 237. The scanner image processing unit 231 performs MTF correction, color conversion processing, image area determination processing, etc., in the case where the copy function is performed. Here, the MTF correction is processing to correct the MTF of read that changes depending on the read rate. The color conversion processing is processing to convert a device-dependent color space (e.g., RGB) into a device-independent color space (e.g., Lab). The image area determination processing is processing to determine the attribute, such as text, image, graphic, and line, within an image. By this image area determination processing, attribute information indicating the attribute of each object is generated. The printer image processing unit 232 performs RIP processing to interpret a PDL language and convert the PDL language into bitmap data in the case where the print function is performed. At the time of the RIP processing, processing to generate attribute information indicating the attribute of an object is also performed. The color conversion processing unit 233 performs processing to convert the color space of input image data into a color space (e.g., CMYK) corresponding to the printer unit 130. The image correction processing unit 234 performs correction processing, such as density correction processing, line width adjustment processing, and filter processing, on input image data. Details of each piece of the correction processing will be described later. The toner amount control processing unit 235 performs processing to control the toner amount per unit area, which is used for image formation. The gamma processing unit 236 performs processing to correct the tone level of input image data so as to match with the density characteristics of the printer unit 130. The halftone processing unit 237 performs processing to convert the tone level value (e.g., 256 tone levels) of input image data into N-valued (e.g., binary) image data (halftone image data) that can be output by the printer unit 130.

The setting management unit 240 manages various setting contents relating to image processing. The setting contents that are managed here include, for example, a setting relating to filter processing, such as sharpening and smoothing, a setting relating to line width adjustment, a setting relating to density correction, etc. Further, the setting management unit 240 also performs control to limit the applied-portion of the contents set via the user interface in accordance with the necessity.

The image output unit 250 outputs image data on which various kinds of image processing have been performed in the image processing unit 230 by using the printer unit 130.

Subsequently, the density correction processing, the line width adjustment processing, and the filter processing performed by the image correction processing unit 234 are explained in detail.

Figure 3:
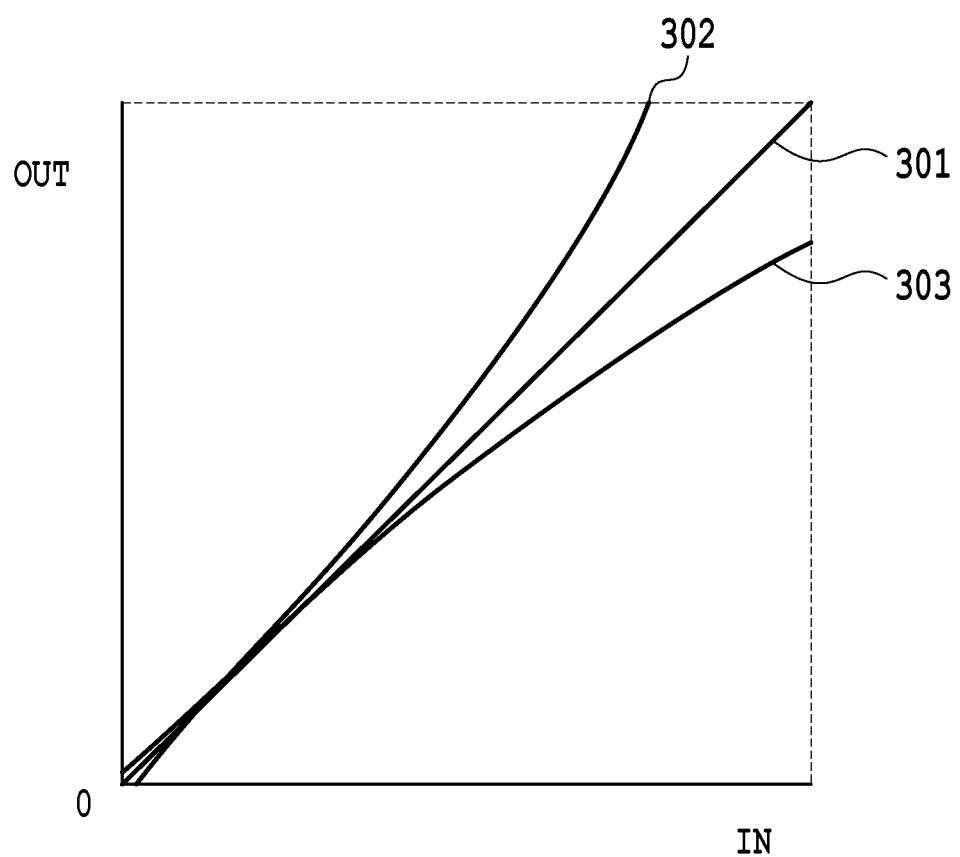
FIG. 3 is a diagram showing an example of a density correction LUT.

First, the density correction processing is processing to correct the density of each color of CMYK, and here, it is assumed that the density of each of CMYK is corrected by using a one-dimensional lookup table (hereinafter, LUT). FIG. 3 is a diagram showing an example of a density correction LUT in which the horizontal axis represents the input density value and the vertical axis represents the output density value. In FIG. 3, a straight line 301 indicates the LUT that is used in the case where the density is neither increased nor decreased, a curve 302 indicates the LUT that is used in the case where the density is increased, and a curve 303 indicates the LUT that is used in the case where the density is decreased, respectively.

Figure 4A:
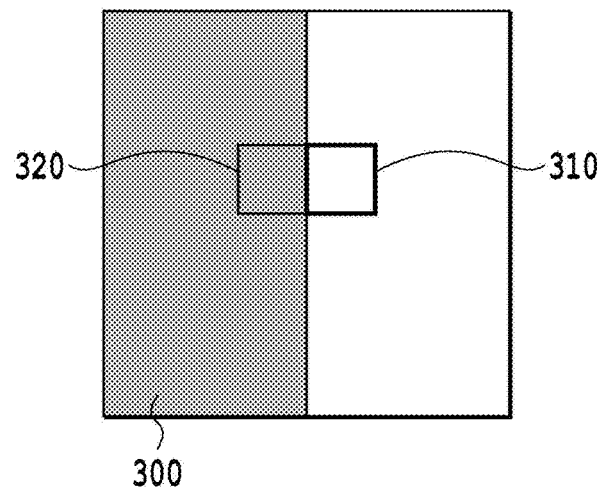
FIG. 4A is a diagram explaining how to increase line width and FIG. 4B is a diagram explaining how to decrease line width.
Figure 4B:
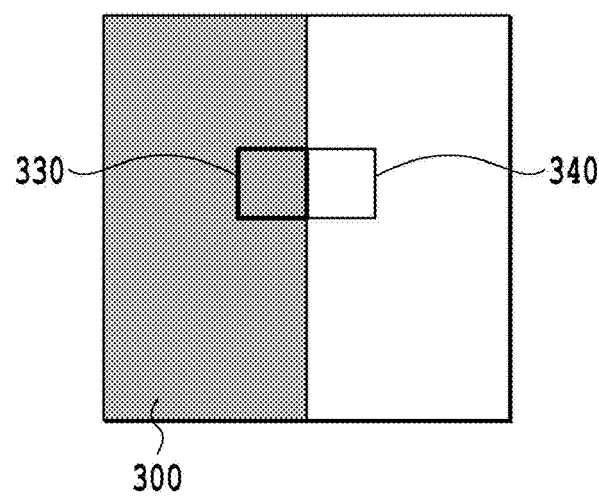

Next, the line width adjustment processing is processing to increase or decrease the width of a character or a line within an image. FIG. 4A is a diagram explaining how to increase the line width and FIG. 4B is a diagram explaining how to decrease the line width. First, the case where the line width is increased by extending a text area 300 represented in gray is explained. In this case, a pixel 310 indicated by a thick frame in FIG. 4A is taken to be a pixel of interest and on a condition that the attribute of the pixel of interest is background, the attribute of an adjacent pixel 320 thereof is text, and the density is higher than or equal to a threshold value, the text area 300 is extended by replacing the pixel of interest 310 with the adjacent pixel 320. Next, the case where the line width is decreased by narrowing the text area 300 is explained. In this case, a pixel 330 indicated by a thick frame in FIG. 4B is taken to be a pixel of interest and on a condition that the attribute of the pixel of interest is text and the density is higher than or equal to a threshold value, provided that the attribute of an adjacent pixel 340 thereof is background, the text area 300 is narrowed by replacing the pixel of interest 330 with the adjacent pixel 340.

Finally, the filter processing is explained. The filter processing is processing to enhance the edge of an object within an image (sharpening) or to smooth the contour of an object (smoothing). FIG. 5A to FIG. 5C are explanatory diagrams of the filter processing. FIG. 5A is a diagram showing corresponding pixels of an area (area of interest) on which the filter processing is to be performed, FIG. 5B shows an example of a filter that is used for the sharpening processing, and FIG. 5C shows an example of a filter that is used for the smoothing processing, respectively. Then, for an image (area of interest) having a window size of N pixels×N pixels (N is an integer, such as 3, 5, and 7) with a pixel of interest (pixel indicated by coordinates (i, j)) as a center, weighting is performed with a filter having the same size and coefficients determined in advance. For example, in the case of the sharpening processing, the filter shown in FIG. 5B is used and the pixel value is multiplied by the coefficient in the corresponding position, such as that the pixel value of the pixel (i−1, j−1) is multiplied by the coefficient "0" in a corresponding position 501 and the pixel value of the pixel (i, j−1) is multiplied by the coefficient "−1" in a corresponding position 502, and all the obtained products of the multiplication are added. Then, the sum of addition thus obtained being divided by 1 is output as a corrected value of the pixel of interest indicated by the coordinates (i, j), i.e., as an edge enhancement value. Then, by performing the operation such as this on the entire image area of the processing target while shifting the area of interest by one pixel at a time, the sharpening processing is implemented. Then, by performing similar processing by using the filter shown in FIG. 5C, the smoothing processing is implemented. In the case of FIG. 5C, the obtained sum of addition is divided by "13", which is the total sum of the filter coefficients.

The range of the present invention is not limited to the filter processing, the density correction processing, the line width adjustment processing, and the halftone processing, which will be described in each of the following embodiments, but it is possible to apply the present invention to various kinds of image processing that are performed in an image forming apparatus.

First Embodiment

First, an aspect is explained as a first embodiment, in which control is performed so as to switch portions (object attributes) to which the filter processing is applied between the case where sharpening is selected as the effect of the filter processing and the case where smoothing is selected.

Specifically, in the case where sharpening is selected, control is performed so that the filter processing is applied to the entire image (objects of all attributes). On the other hand, in the case where smoothing is selected, in order to maintain the legibility of character and the visual recognizability of graphic, control is performed so that the filter processing is applied only to objects of attributes other than text and graphic. Here, explanation is given by taking the case where there are three kinds of object attribute, i.e., image, graphic, and text, as an example.

Figure 6A:
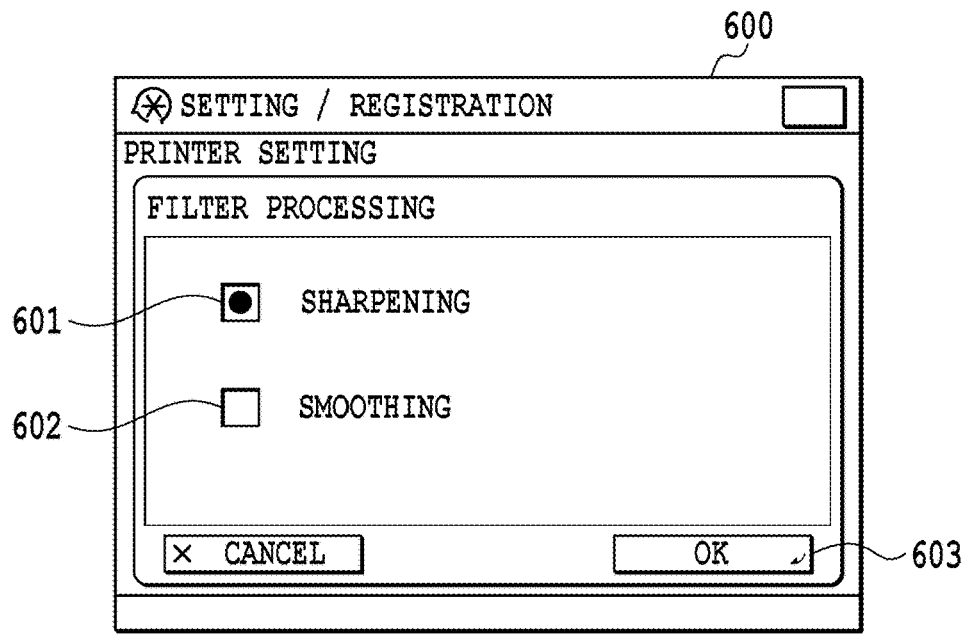
FIG. 6A and FIG. 6B are diagram each showing an example of a UI screen for a user to specify the effect of filter processing.
Figure 6B:
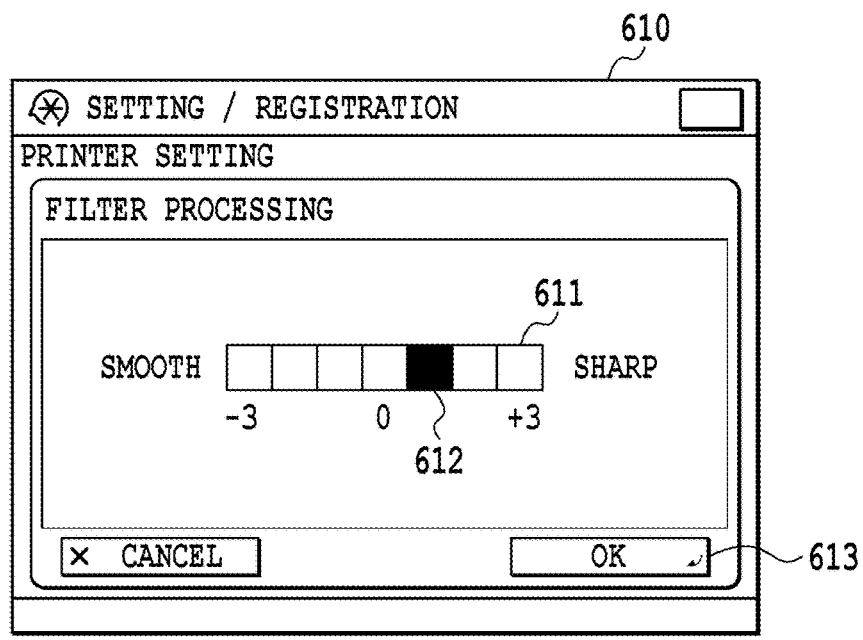
Figure 7:
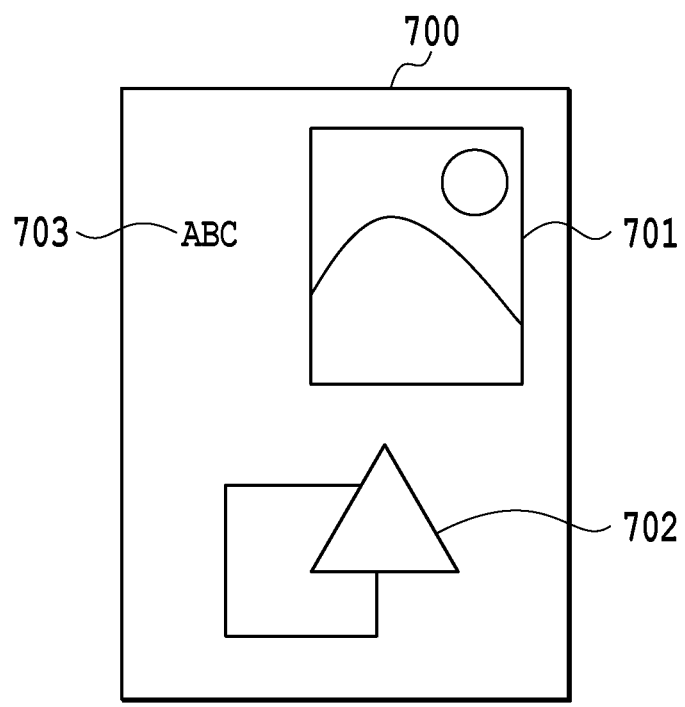
FIG. 7 is a diagram showing an example of an input image on which filter processing is to be performed.

FIG. 6A and FIG. 6B are diagrams each showing an example of a user interface screen for a user to specify execution of sharpening or smoothing as the effect of the filter processing. By a user pressing down an OK button 603 in the state where, for example, a radio button 601 within a UI screen 600 shown in FIG. 6A is selected, it is possible to set sharpening as the effect of the filter processing. Here, the UI screen 600 is in the state where the radio button 601 is selected. Then, in the present embodiment, in the case where sharpening is set, the processing using the filter having the coefficients as in FIG. 5B described previously is performed on the entire image. FIG. 7 is a diagram showing an example of an input image on which the filter processing is to be performed. In an input image 700, objects of three kinds of attribute exist, i.e., an image object 701, a graphic object 702, and a character object 703. In the case where sharpening is selected, the filter processing with the effect of sharpening is performed on the objects of all these attributes. On the other hand, in the case where a user presses down the OK button 603 in the state where a radio button s602 is selected, smoothing is set as the effect of the filter processing and the processing using the filter having the coefficients as in FIG. 5C described previously is performed only on the object of image attribute.

As the UI screen for a user to specify the effect of the filter processing, such a UI screen as shown in FIG. 6B may be used. In the case of a UI screen 610 shown in FIG. 6B, a user specifies sharp or smooth by moving a pointer to a desired position on an adjustment bar 611 by using a mouse or the like. In the example of the UI screen 610, in the range between −3 and −1, the effect of smoothing is obtained and the filter processing is applied only to the object of image attribute. On the other hand, in the range between +1 and +3, the effect of sharpening is obtained and the filter processing is applied to the objects of all attributes. On the adjustment bar 611, a black square 612 indicates the position of a user selection and in the case where an OK button 613 is pressed down in this state, the filter processing with the effect of sharpening is performed at an intensity corresponding to +1.

The form of the UI screen is not limited to the above-described examples and for example, a UI screen having any form, such as the form of a pull-down list, may be used.

Subsequently, control of the filter processing according to the present embodiment is explained.

Figure 8:
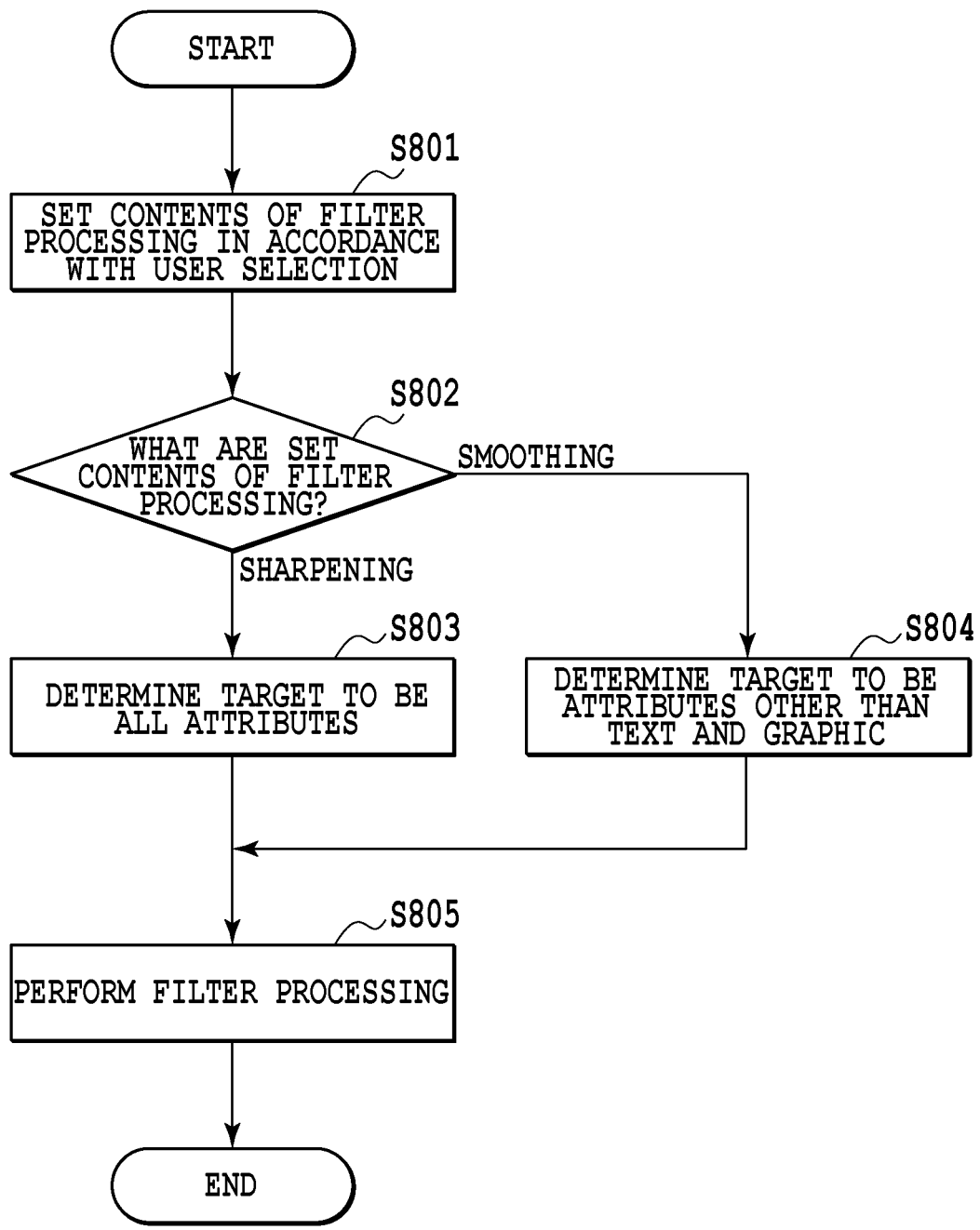
FIG. 8 is a flowchart showing a flow of control of filter processing according to a first embodiment.

FIG. 8 is a flowchart showing a flow of the control of the filter processing according to the present embodiment. The series of processing is implemented by the CPU 111 executing a control program stored in the HDD 114 after developing the control program onto the RAM 113.

At step 801, the setting management unit 240 receives a user selection to specify the effect of the filter processing, which is input via the above-described UI screen, and sets one of sharpening and smoothing in accordance with the user selection.

At step 801, the setting management unit 240 determines whether the set contents of the filter processing are sharpening or smoothing. In the case where sharpening is set, the processing proceeds to step 803. On the other hand, in the case where smoothing is set, the processing proceeds to step 804.

At step 803, the setting management unit 240 determines the object attribute to which sharpening is applied as the effect of the filter processing to be all the attributes. Due to this, for example, in the case of the image in which three kinds of object exist, i.e., image, graphic, and text, as in FIG. 7, the filter processing with the effect of sharpening is applied to all these objects.

At step 804, the setting management unit 240 determines the object attribute to which smoothing is applied as the effect of the filter processing to be the remaining attribute other than text and graphic. In the case of the present embodiment, the target of the filter processing is limited only to the object of image attribute as a result. Due to this, to the portions of graphic and text, the filter processing is not applied, and therefore, the legibility and visual recognizability thereof are guaranteed.

At step 805, the image correction processing unit 234 performs the filter processing on the object of attribute determined to be the target at S803 or S804 with the contents of the filter processing set at S801 based on the attribute information on the input image data. In other words, in the case where sharpening is set, the filter processing is performed on the objects of all attributes and in the case where smoothing is set, the filter processing is performed only on the object of image attribute.

The above is the contents of the control of the filter processing according to the present embodiment.

In the present embodiment, in accordance with the setting of the effect of the filter processing, the applied-portions (object attributes) are switched. Due to this, in the case where a user desires to, for example, smooth the photo (image) portion and specifies smoothing, it is possible to prevent the occurrence of a situation in which the portions of character (text) and graphic within the same page are dulled without the need of the user to perform a complicated input operation on the UI screen for filter processing. In this manner, it is possible to eliminate undesirable effects due to the filter processing while simplifying the user interface for setting the filter processing.

Second Embodiment

In the first embodiment, the case where the contents of the image correction processing are the filter processing is explained. Next, the case where the contents of the image correction processing are the density correction processing is explained as a second embodiment.

Explanation of the portions in common to those of the first embodiment is omitted or simplified and in the following, different points are explained mainly.

In the present embodiment, control is performed so that in the case a user specifies an increase in density, the density correction is applied to the entire image, but in the case where a user specifies a decrease in density, the density correction is not performed on the object of text attribute in order to prevent the legibility of character from being reduced. Hereinafter, detailed explanation is given.

Figure 9A:
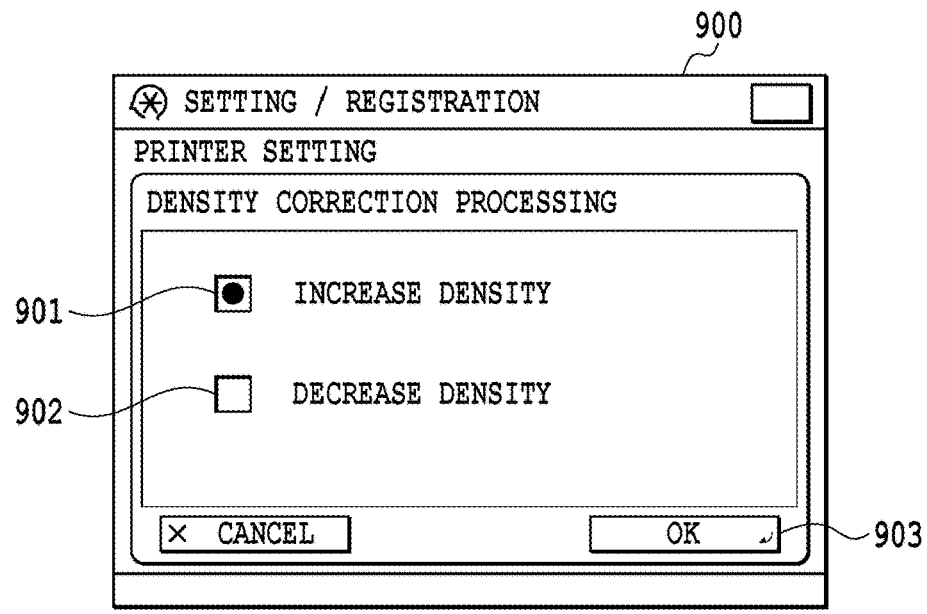
FIG. 9A and FIG. 9B are diagrams each showing an example of a UI screen for a user to specify the effect of density correction processing.
Figure 9B:
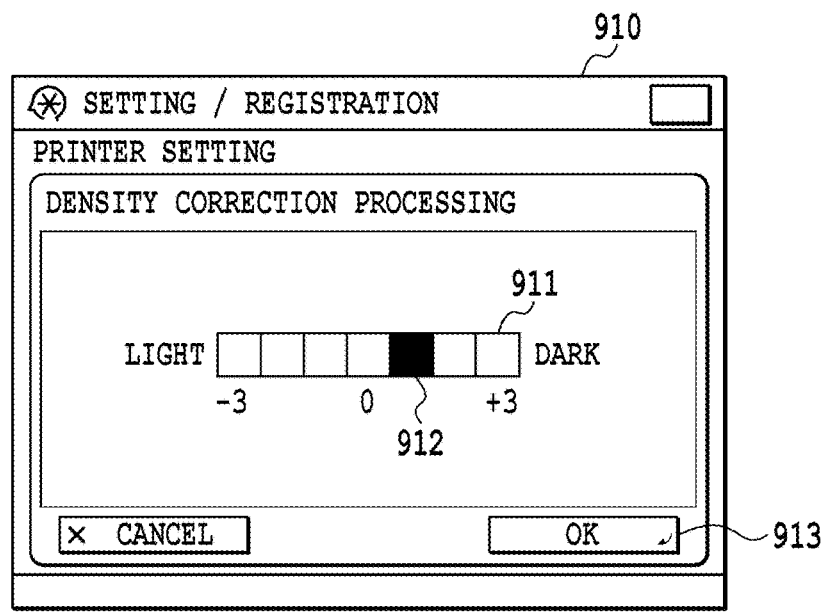

FIG. 9A and FIG. 9B are diagrams each showing an example of a user interface screen for a user to specify an increase in density or a decrease in density as the effect of the density correction processing. By a user pressing down an OK button 903 in the state where, for example, a radio button 901 within a UI screen 900 shown in FIG. 9A is selected, it is possible to set "Increase density" as the effect of the density correction processing. Here, the UI screen 900 is in the state where the radio button 901 is selected, and therefore, correction is performed so that density is increased. Then, in the present embodiment, in the case where "Increase density" is set, control is performed so that the density correction processing is applied to the entire image, and in the case where "Decrease density" is set, the attribute of the object on which the density correction processing is to be performed is controlled so that the density correction processing is not applied to the object of text attribute.

As the UI screen for a user to specify the effect of the density correction processing, for example, such a UI screen as shown in FIG. 9B may be used. In the case of a UI screen 910 shown in FIG. 9B, a user specifies dark or light along with the degree thereof by moving a pointer to a desired position on an adjustment bar 911 by using a mouse or the like. In the example of the UI screen 910, in the range between −3 and −1, the effect to decrease density is obtained and the density correction processing is applied only to the objects other than character. On the other hand, in the range between +1 to +3, the effect to increase density is obtained and the density correction processing is applied to the objects of all attributes. On the adjustment bar 911, a black square 912 indicates the position of a user selection and in the case where an OK button 913 is pressed down in this state, the correction processing to increase density is performed at an intensity corresponding to +1.

As in the first embodiment, the form of the UI screen is not limited to the above-described examples and for example, a UI screen having any form, such as the form of a pull-down list, may be used.

Subsequently, control of the density correction processing according to the present embodiment is explained.

Figure 10:
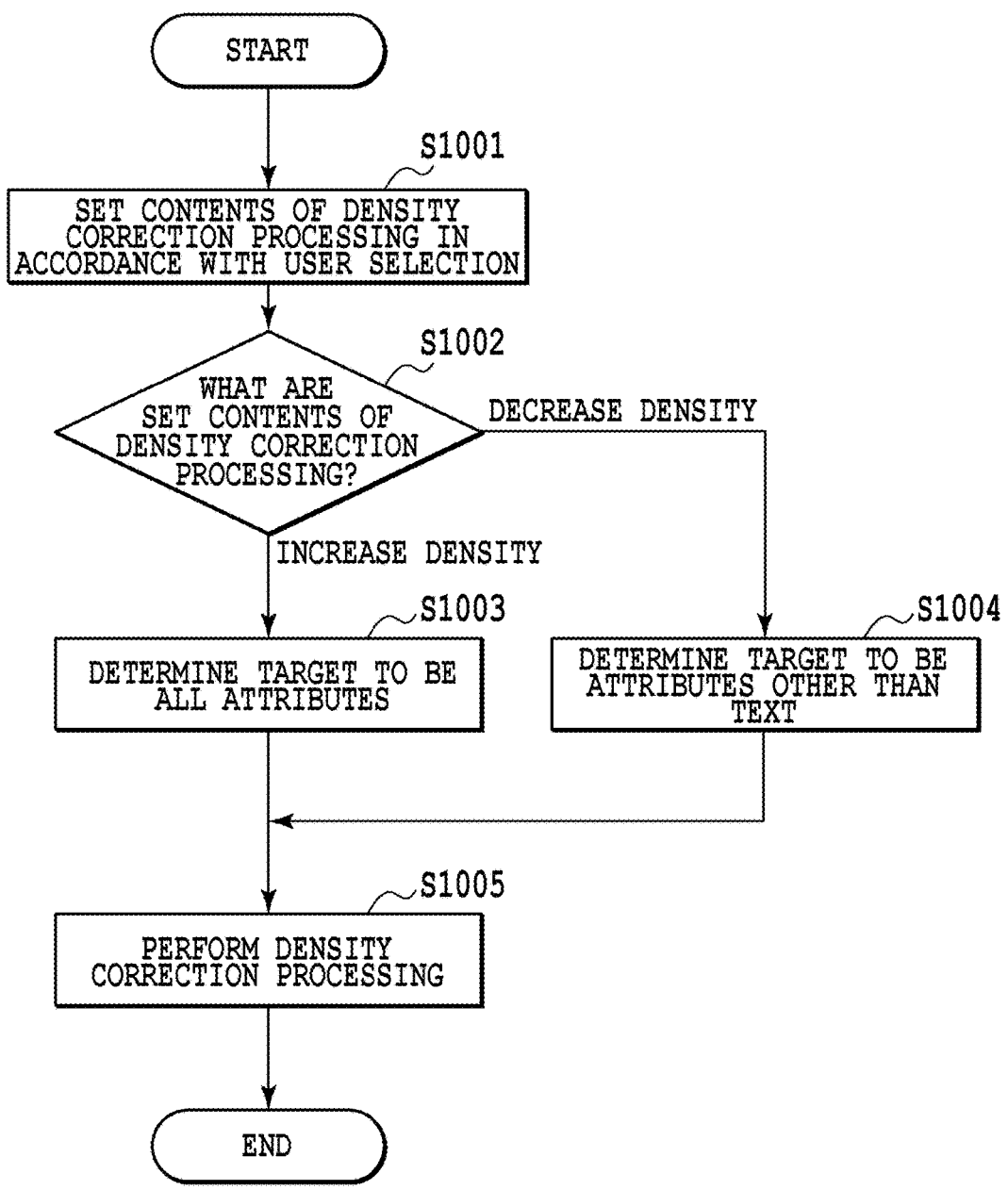
FIG. 10 is a flowchart showing a flow of control of density correction processing according to a second embodiment.

FIG. 10 is a flowchart showing a flow of the control of the density correction processing according to the present invention. The series of processing is implemented by the CPU 111 executing a control program stored in the HDD 114 after developing the control program onto the RAM 113.

At step 1001, the setting management unit 240 receives a user selection to specify the effect of the density correction processing, which is input via the above-described UI screen, and sets one of "Increase density" and "Decrease density" in accordance with the user selection.

At step 1002, the setting management unit 240 determines whether the set contents of the density correction processing are "Increase density" or "Decrease density". In the case where "Increase density" is set, the processing proceeds to step 1003. On the other hand, in the case where "Decrease density" is set, the processing proceeds to step 1004.

At step 1003, the setting management unit 240 determines the object attribute to which the density correction processing is applied to be all the attributes. Due to this, for example, in the case of the image in which three kinds of object exist, i.e., image, graphic, and text, as in FIG. 7, the correction processing to increase density is applied to all these objects.

At step 1004, the setting management unit 240 determines the object attribute to which the density correction processing is applied to be the remaining attributes other than text. In the case of the present embodiment, the target of the density correction processing is limited only to the objects of image attribute and graphic attribute. Due to this, to the portion of character within the image, the correction processing to decrease density is not applied, and therefore, the legibility of character is guaranteed.

At step 1005, the image correction processing unit 234 performs the density correction processing on the object of the attribute determined to be the target at S1003 or S1004 with the contents of the density correction processing set at S1001 based on the attribute information on the input image data. In other words, in the case where "Increase density" is set, the density correction processing is performed on the objects of all attributes and in the case where "Decrease density" is set, the density correction processing is performed only on the objects of attributes other than text.

The above is the contents of the control of the density correction processing according to the present embodiment.

In the present embodiment, in accordance with the setting contents of the effect of the density correction processing, the applied-portions (object attributes) are switched. Due to this, in the case where a user desires to, for example, decrease the density of a photo (image) or a graphic, it is possible to prevent legibility from being reduced, which is caused by the density of character within the same page being decreased, without the need of the user to perform a complicated input operation on the UI screen. In this manner, it is possible to eliminate undesirable effects due to the density correction processing while simplifying the user interface for setting the density correction processing.

Third Embodiment

In the first embodiment, the case where the contents of the image correction processing are the filter processing is explained and in the second embodiment, the case where the contents of the image correction processing are the density correction processing is explained, respectively. Next, the case where the contents of the image correction processing are the line width adjustment processing is explained as a third embodiment.

Explanation of the portions in common to those of the first and second embodiments is omitted or simplified and in the following, different points are explained mainly.

Figure 11:
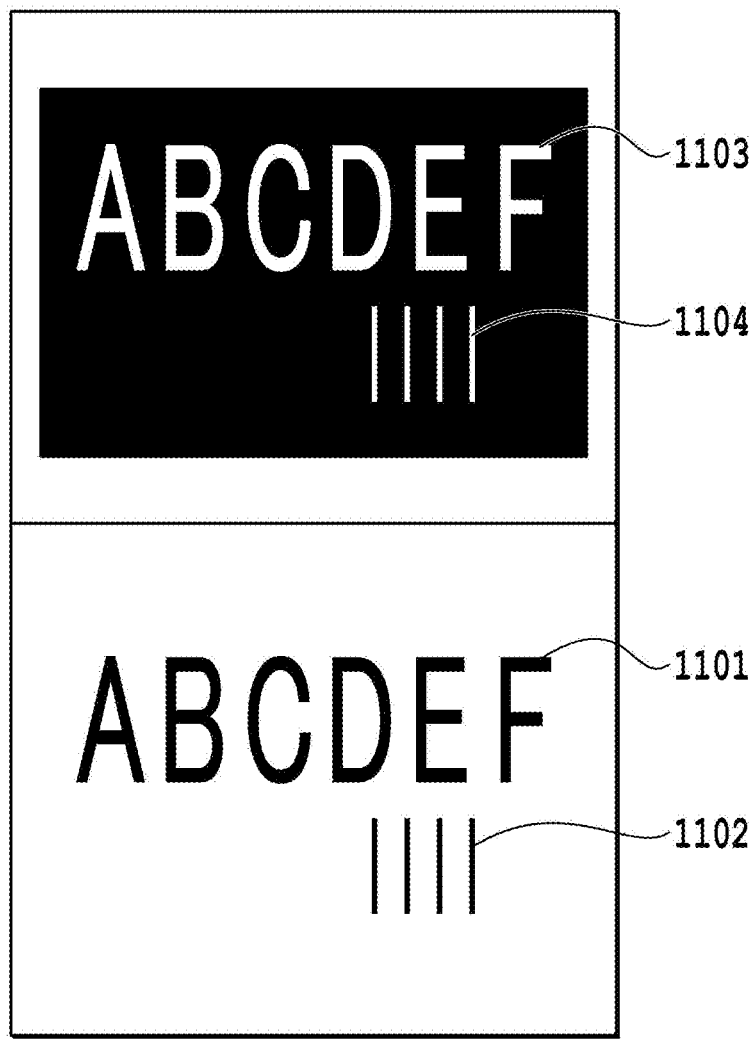
FIG. 11 is a diagram showing an example of an input image on which line width adjustment processing is to be performed.

FIG. 11 is a diagram showing an example of an input image on which the line width adjustment processing is to be performed, and in which a character string of alphabets "ABC" and vertical thin lines are drawn in two rows, i.e., the upper row and the lower row. In an image 1100 shown in FIG. 11, on the upper half of the page, white inverted characters (so-called solid-white characters) 1103 and white inverted thin lines (so-called solid-white thin lines) 1104 exist in the black background. Because of the characteristics of image forming processing, even in the case where the defined line width is the same, as compared to normal characters 1101/thin lines 1102 with no background (=background is white), the inverted characters 1103 and the inverted thin lines 1104 are more likely to be hidden by the background and to become thinner. Because of this, in the case where the processing to decrease the line width with the normal character as a reference is applied uniformly to the entire image in which normal characters/thin lines (=non-inverted characters/non-inverted thin lines) and inverted characters/inverted thin lines exist mixedly, the inverted characters 1103 and the inverted thin lines 1104 are hidden by the background, and therefore, legibility is reduced.

Consequently, in the present embodiment, portions to which the line width adjustment processing is applied are switched between the case where the line width is increased and the case where the line width is decreased. Specifically, control is performed so that, in the case where an increase in line width is specified, the line width adjustment processing is applied to all the characters/thin lines within the page and in the case where a decrease in line width is specified, the line width adjustment processing is applied only to the normal characters/thin lines with no background. Hereinafter, detailed explanation is given. In the present embodiment, it is assumed that four kinds of object attribute, i.e., image, graphic, text, and line (thin line), exist and the scanner image processing unit 231 and the printer image processing unit 232 described previously generate attribute information with which it is possible to identify these four kinds of attribute.

Figure 12A:
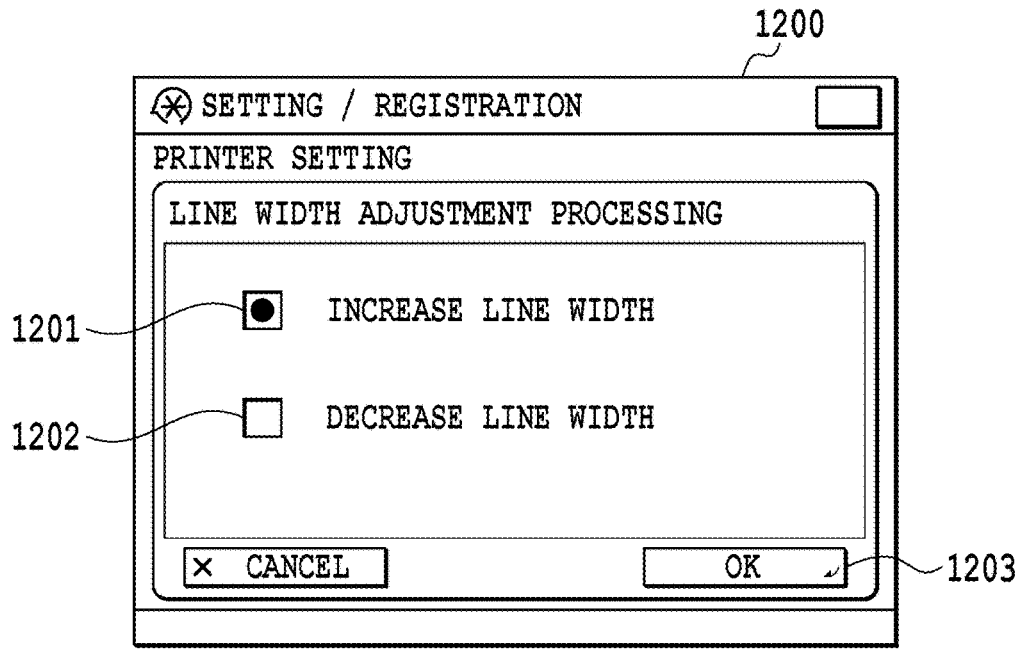
FIG. 12A and FIG. 12 B are diagrams each showing an example of a UI screen for a user to specify the effect of line width adjustment processing.
Figure 12B:
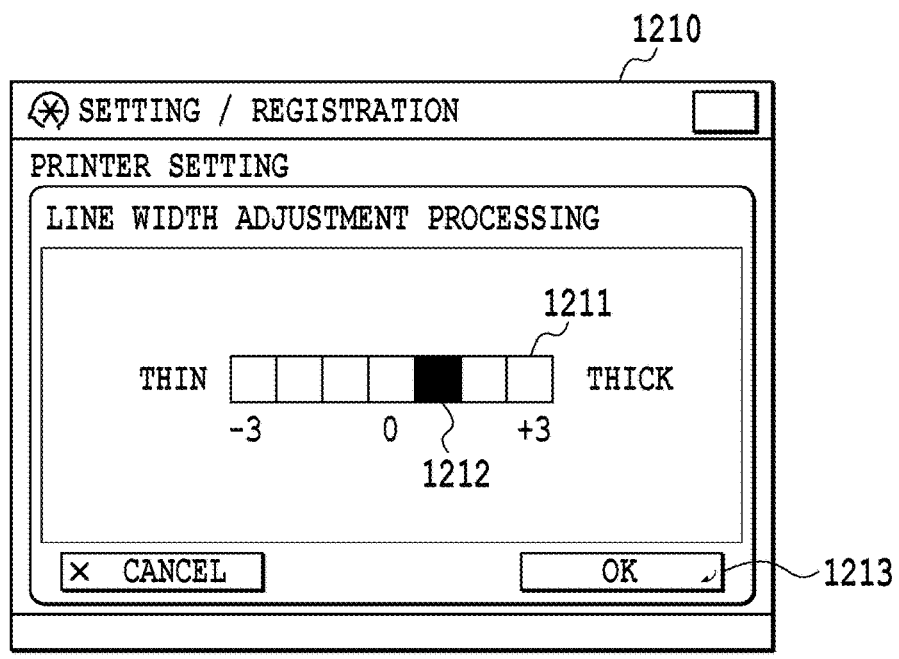

FIG. 12A and FIG. 12B are diagrams each showing an example of a user interface screen for a user to specify an increase in line width or a decrease in line width as the effect of the line width adjustment processing. By a user pressing down an OK button 1203 in the state where, for example, a radio button 1201 within a UI screen 1200 shown in FIG. 12A is selected, it is possible to set "Increase line width" as the effect of the line width adjustment processing. Here, the UI screen 1200 is in the state where the radio button 1201 is selected, and therefore, correction is performed so that the line width increases. Then, in the present embodiment, the target of the line width adjustment processing is controlled so that the line width adjustment processing is applied to all the characters/thin lines including the inverted characters and inverted thin lines in the case where "Increase line width" is set, and the line width adjustment processing is applied to the normal characters/thin lines with no background in the case where "Decrease line width" is set.

As the UI screen for a user to specify the effect of the line width adjustment processing, such a UI screen as shown in FIG. 12B may be used. In the case of a UI screen 1210 shown in FIG. 12B, a user specifies thick or thin along with the degree thereof by moving a pointer to a desired position on an adjustment bar 1211 by using a mouse or the like. In the example of the UI screen 1210, in the range between −3 and −1, the effect to decrease line width is obtained and the processing to correct the line width is applied only to the normal characters and thin lines with no background. On the other hand, in the range between +1 and +3, the effect to increase the line width is obtained and the processing to correct the line width is applied to all the characters and thin lines. In the adjustment bar 1211, a black square 1211 indicates the position of a user selection and in the case where an OK button 1213 is pressed down in this state, the correction processing to increase the line width is performed by an amount corresponding to +1.

As in the first and second embodiments, the form of the UI screen is not limited to the above-described examples, and a UI screen having any form, such as the form of a pull-down list, may be used.

Subsequently, control of the line width adjustment processing according to the present embodiment is explained.

Figure 13:
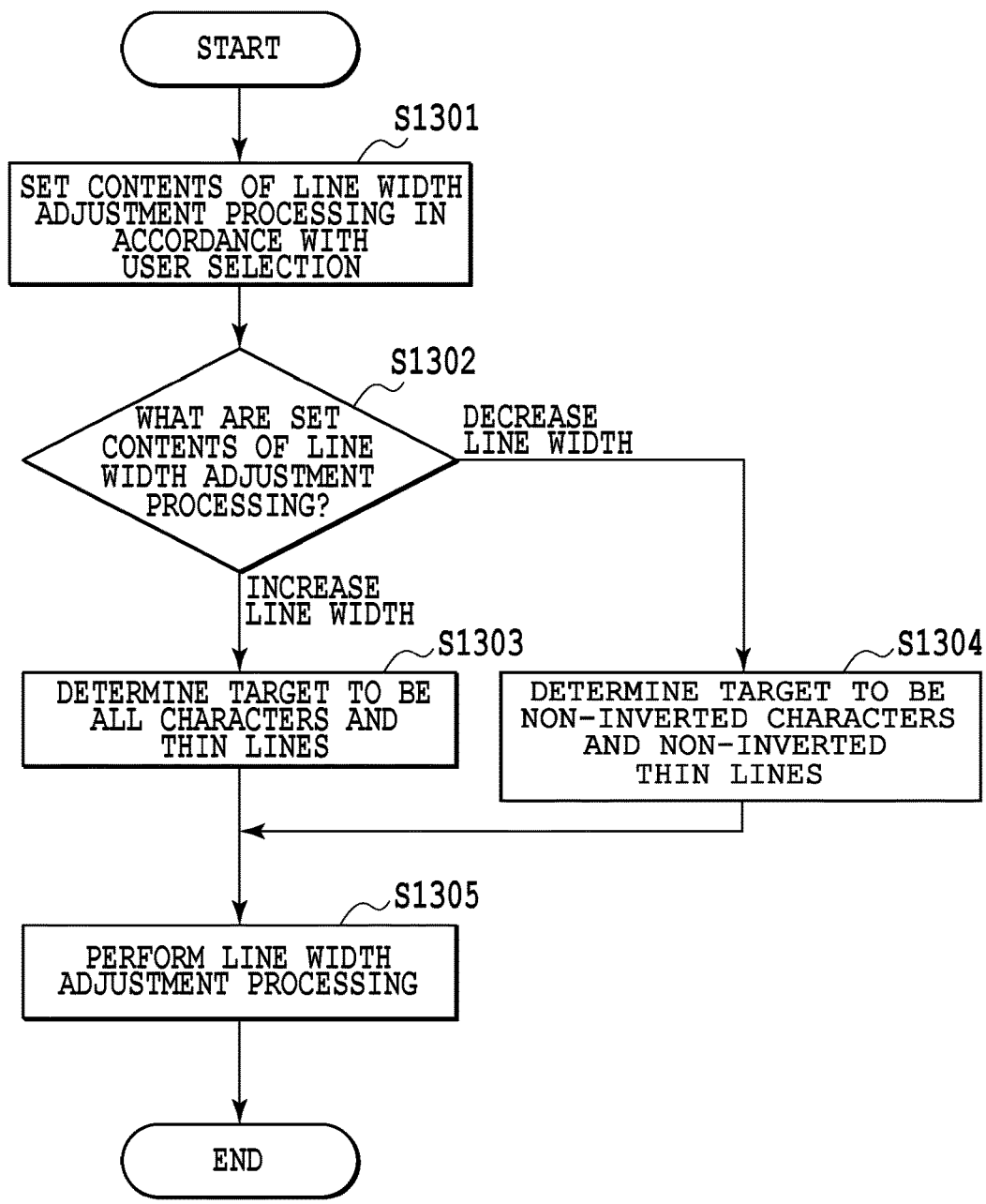
FIG. 13 is a flowchart showing a flow of control of line with adjustment processing according to a third embodiment.

FIG. 13 is a flowchart showing a flow of the control of the line width adjustment processing according to the present embodiment. The series of processing is implemented by the CPU 111 executing a control program stored in the HDD 114 after developing the control program onto the RAM 113.

At step 1301, the setting management unit 240 receives a use selection to specify the effect of the line width adjustment processing, which is input via the above-described UI screen, and sets one of "Increase line width" and "Decrease line width" in accordance with the user selection.

At step 1302, the setting management unit 240 determines whether the set contents of the line width adjustment processing are "Increase line width" or "Decrease line width". In the case where "Increase line width" is set, the processing proceeds to step 1303. On the other hand, in the case where "Decrease line width" is set, the processing proceeds to step 1304.

At step 1303, the setting management unit 240 determines the target to which the line width adjustment processing is applied to be all the characters/thin lines. In other words, whether inverted or not inverted, all the objects of text attribute and line attribute are determined to be the target of the line width adjustment processing. Due to this, in the case of the image shown in FIG. 11, the correction processing to increase the line width is applied to all of the normal characters 1101, the normal thin lines 1102, the inverted characters 1103, and the inverted thin lines 1104.

At step 1304, the setting management unit 240 determines the target to which the line width adjustment processing is applied to be the normal characters/thin lines with no background. In other words, the target of the line width adjustment processing is limited only to the objects of the non-inverted character and the non-inverted thin line among the objects of character attribute and line attribute. Due to this, for example, in the case of the image shown in FIG. 11, the correction processing to decrease the line width is applied only to the normal characters 1101 and the thin lines 1102 located on the lower-half of the page and is not applied to the inverted characters 1103 and the inverted thin lines 1104 located on the upper-half of the page.

At step 1305, the image correction processing unit 234 performs the line width adjustment processing on the characters/thin lines, which are the targets determined at S1303 or S1304, with the contents of the line width adjustment processing set at S1301 based on the attribute information on the input image data. In other words, in the case where "Increase line width" is set, the line width adjustment processing is performed by using the method shown in FIG. 4A described previously on all the characters/thin lines within the page. Then, in the case where "Decrease line width" is set, the line width adjustment processing is performed only on the normal characters/thin lines with no background by using the method shown in FIG. 4B described previously. At this time, whether the characters/thin lines are the inverted characters/inverted thin lines or the normal characters/thin lines with no background is determined by also taking into consideration the information on the pixel value in addition to the attribute information.

The above is the contents of the control of the line width adjustment processing according to the present embodiment.

Modification Example

Next, as a modification example of the present embodiment, an aspect is explained in which whether normal characters/thin lines (=non-inverted characters/non-inverted thin lines) with no background and inverted characters/inverted thin lines exist mixedly within the same page is determined and portions to which the line width adjustment processing is applied are switched in accordance with the determination results. Specifically, control as follows is performed.

First, in the case where inverted characters/inverted thin lines and non-inverted characters/non-inverted thin lines do not exist mixedly within the same page, all the characters and thin lines are determined to be the target of the line width adjustment processing. On the other hand, in the case where inverted characters/inverted thin lines and non-inverted characters/non-inverted thin lines exist mixedly within the same page, control is performed so that, on a condition that "Increase line width" is set, the line width adjustment processing is applied only to the inverted characters/inverted thin lines, and on a condition that "Decrease line width" is set, the line width adjustment processing is applied only to the normal characters/thin lines (=non-inverted characters/non-inverted thin lines) with no background. Hereinafter, detailed explanation is given.

Figure 14:
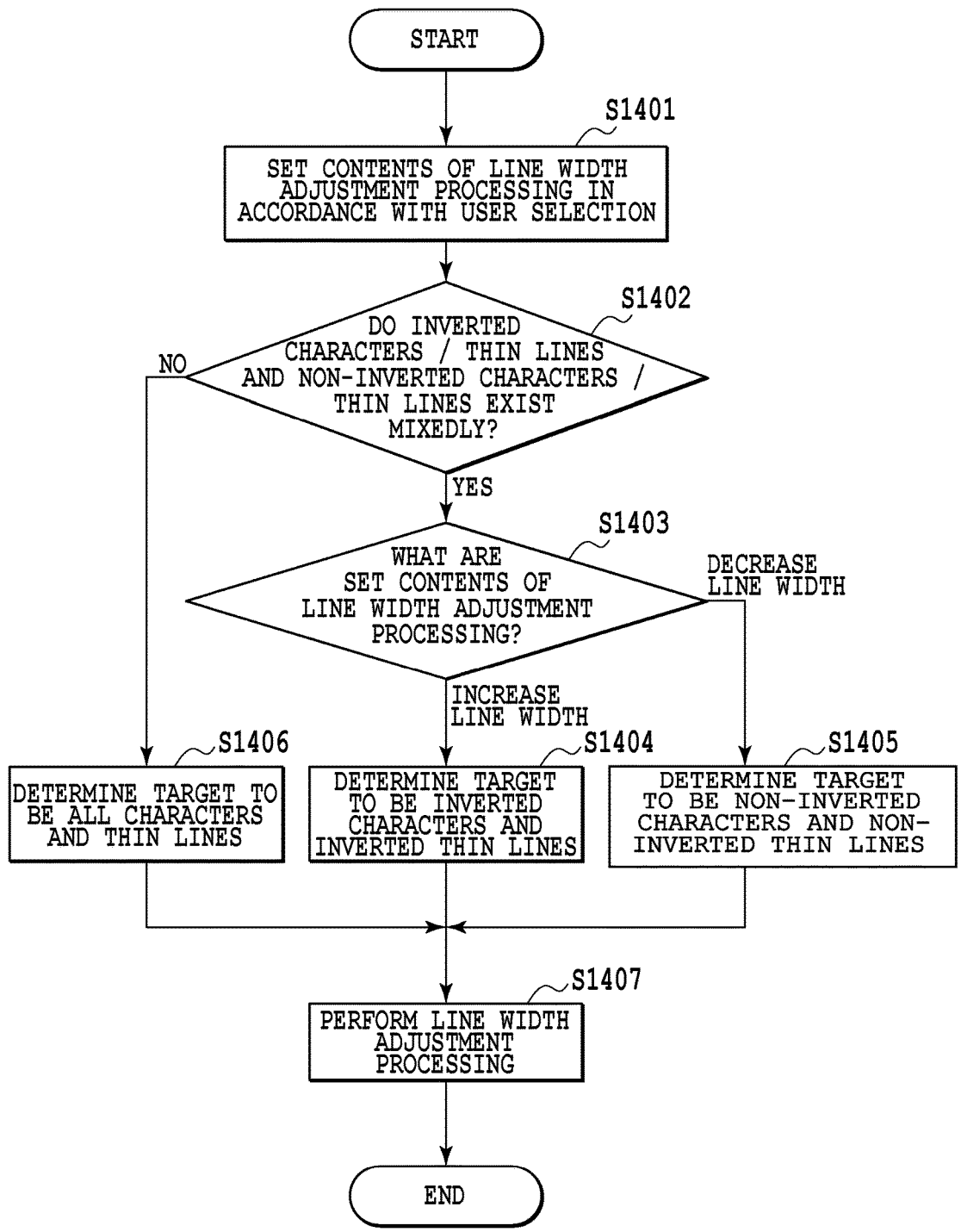
FIG. 14 is a flowchart showing a flow of control of line width adjustment processing according to a modification example of the third embodiment.

FIG. 14 is a flowchart showing a flow of control of the line width adjustment processing according to the present modification example.

Step 1401 is the same as step 1301 described above, and one of "Increase line width" and "Decrease line width" is set in accordance with a user selection.

At step 1402, whether inverted characters/inverted thin lines and non-inverted characters/non-inverted thin lines exist mixedly within the same page (within the image data on which processing is to be performed) is determined. This determination is performed based on, for example, attribute information and the density value of each pixel. In the case where it is determined that both exist mixedly, the processing proceeds to step 1403. On the other hand, in the case where it is determined that both do not exist mixedly, the processing proceeds to step 1406.

Step 1403 is the same as S1302 in the flow in FIG. 13 and whether the contents of the line width adjustment processing set by a user selection are "Increase line width" or "Decrease line width" is determined. In the case where "Increase line width" is set, the processing proceeds to step 1404. On the other hand, in the case where "Decrease line width" is set, the processing proceeds to step 1405.

At step 1404, the target to which the line width adjustment processing is applied is limited to the inverted characters and the inverted thin lines. Due to this, for example, in the case of the image shown in FIG. 11, the correction processing to increase the line width is applied only to the inverted characters 1103 and the inverted thin lines 1104 located on the upper-half of the page, and therefore, it is possible to prevent the normal characters 1101 and the thin lines 1102 from becoming too thick.

At step 1405, the target to which the line width adjustment processing is applied is limited to the normal characters and thin lines (non-inverted characters and non-inverted thin lines) with no background. Due to this, for example, in the case of the image shown in FIG. 11, the correction processing to decrease the line width is applied only to the normal characters 1101 and the thin lines 1102 located on the lower-half of the page, and therefore, it is possible to prevent the inverted characters 1103 and the inverted thin lines 1104 from being hidden by the background.

At step 1406, the target to which the line width adjustment processing is applied is determined to be all the characters/thin lines. The reason is that in the case where inverted characters/inverted thin lines and non-inverted characters/non-inverted thin lines do not exist mixedly, it is not necessary to take into consideration the occurrence of the problem described previously caused by increasing or decreasing the line width based on one of the inverted characters/inverted thin lines and the non-inverted characters/non-inverted thin lines. Due to this, for example, in the case of the image shown in FIG. 11, the correction processing to increase the line width is applied to all of the normal characters 1101, the normal thin lines, the non-inverted characters 1103, and the non-inverted thin lines 1104.

At step 1407, the line width adjustment processing is performed on the target determined at S1404 to S1046 with the contents of the line width adjustment processing set at S1401.

The above is the contents of the control of the line width adjustment processing according to the present modification example.

In the present embodiment, in accordance with the set contents of the effect of the line width adjustment processing, characters and thin lines that are the targets are switched. Due to this, in the case where a user specifies, for example, a decrease in line width, it is possible to maintain legibility and visual recognizability without the need of the user to perform a complicated input operation on the UI screen because inverted characters and inverted thin lines are not hidden by the background. In this manner, it is possible to eliminate undesirable effects due to the line width adjustment processing while simplifying the user interface for setting the line width adjustment processing.

Fourth Embodiment

The first to third embodiments are aspects in which the various kinds of correction processing that are performed by the image correction processing unit 234 are dealt with. Next, an aspect is explained as a fourth embodiment in which halftone processing that is performed by the halftone processing unit 237 is dealt with. Explanation of the portions in common to those of the first to third embodiments is omitted or simplified and in the following, different points are explained mainly.

Because of the characteristics of the halftone processing, the smaller the number of lines of a screen to be used, the larger the halftone dot becomes. As a result of this, the density becomes stable, but in the character portion, ruggedness called jaggies occurs as a result. Consequently, in the present embodiment, control is performed so that dither with a small number of lines is not applied to the object of text attribute in order to prevent jaggies from occurring in the character portion. Hereinafter, detailed explanation is given.

Figure 15:
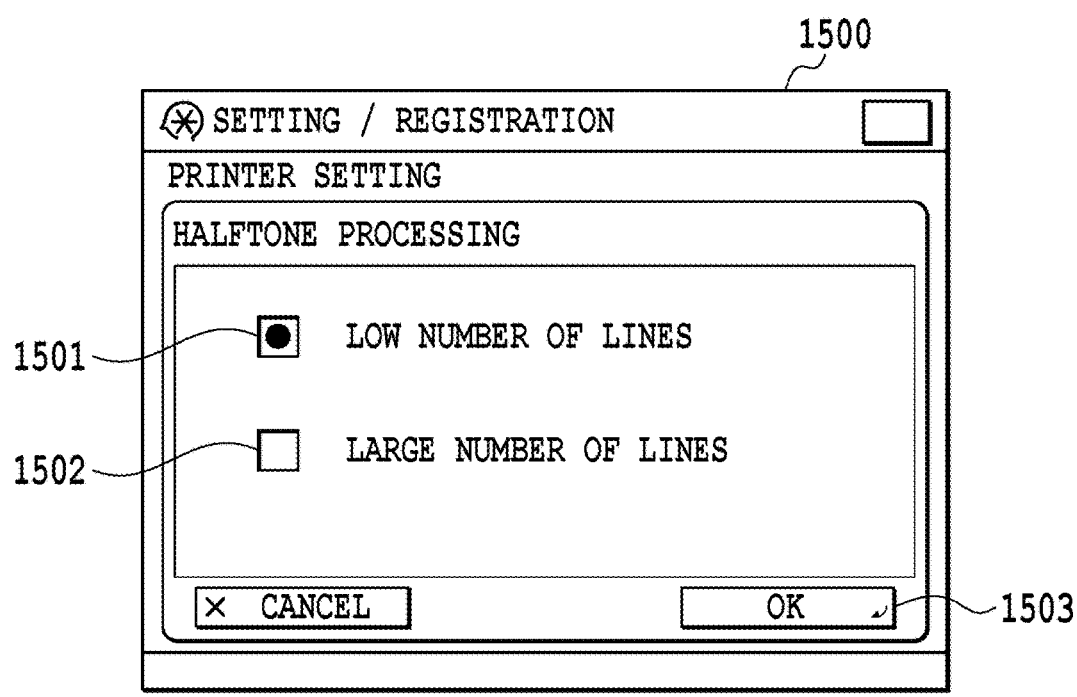
FIG. 15 is a diagram showing an example of a UI screen for a user to specify the number of screen lines to be used in halftone processing.

FIG. 15 is a diagram showing an example of a user interface screen for a user to specify the use of a screen with a small number of lines or the use of a screen with a large number of lines in the halftone processing. By a user pressing down an OK button 1503 in the state where, for example, a radio button 1501 within a UI screen 1500 shown in FIG. 15 is selected, it is possible to set "Small number of lines" as the number of screen lines to be used for the halftone processing. Here, the UI screen 1500 is in the state where the radio button 1501 is selected, and therefore, the halftone processing (dither processing) using a screen with a small number of lines is performed. In the present embodiment, control is performed so that a screen with a small number of lines is not used in the halftone processing for the object of text attribute even in the case where "Small number of lines" is set as described above in view of the problem of jaggies described above. In other words, a screen with a small number of lines is used only for the objects of attributes other than text, such as image and graphic. On the other hand, in the case where "Large number of lines" is set, a screen with a large number of lines is used in the halftone processing for the objects of all attributes.

As in the first to third embodiments, the form of the UI screen is not limited to the above-described example and for example, a UI screen having any form, such as the form of a pull-down list, may be used.

Subsequently, control of the halftone processing according to the present embodiment is explained.

Figure 16:
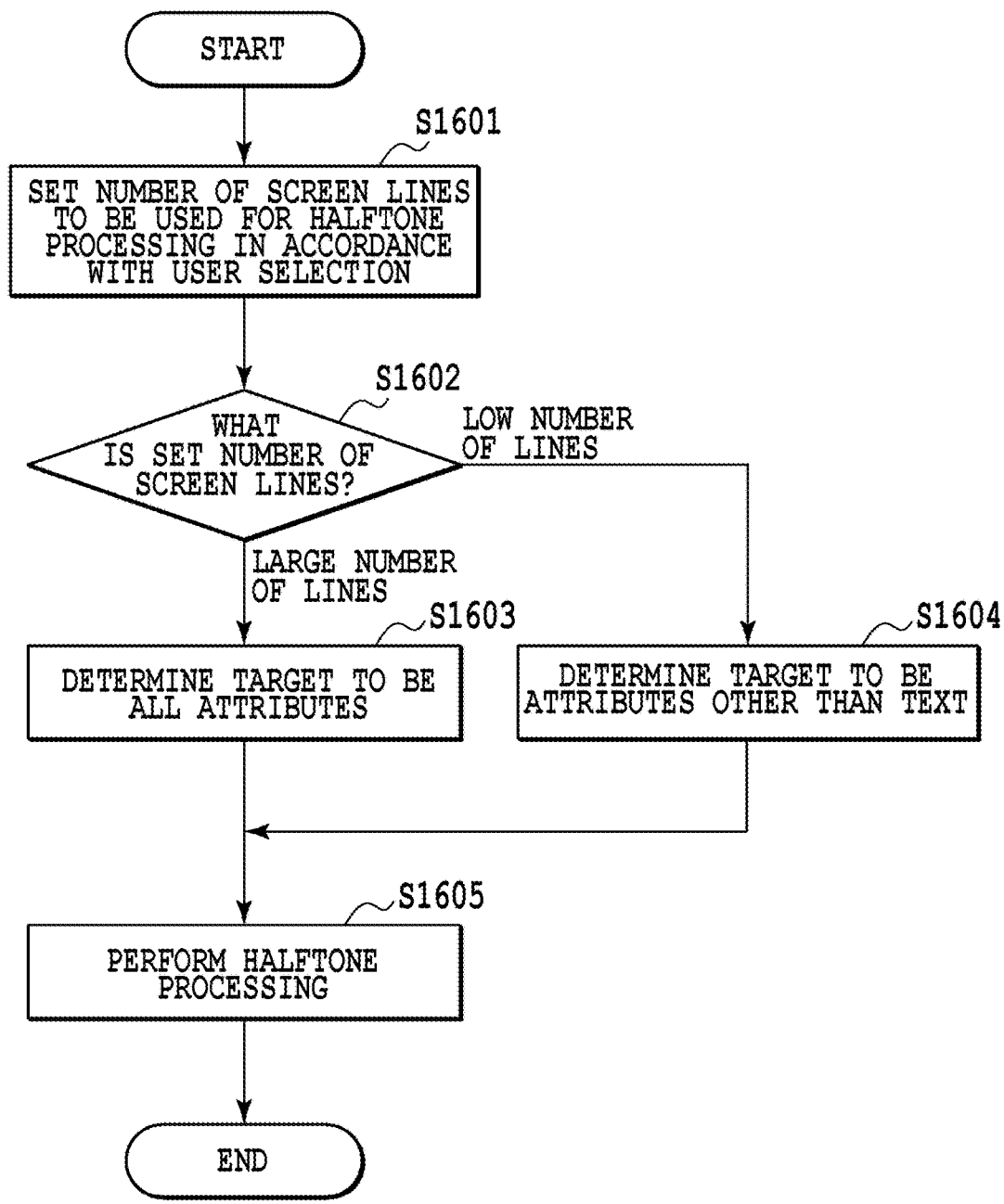
FIG. 16 is a flowchart showing a flow of control of halftone processing according to a fourth embodiment.

FIG. 16 is a diagram showing a flow of the control of the halftone processing according to the present embodiment. The series of processing is implemented by the CPU 111 executing a control program stored in the HDD 114 after developing the control program onto the RAM 113.

At step 1601, the setting management unit 240 receives a user selection to specify the number of screen lines to be used for the halftone processing, which is input via the above-described UI screen, and sets one of "Small number of lines" and "Large number of lines" in accordance with the user selection.

At step 1602, the setting management unit 240 determines whether the set number of screen lines is "Small number of lines" or "Large number of lines". In the case where "Large number of lines" is set, the processing proceeds to step 1603. On the other hand, in the case where "Small number of lines" is set, the processing proceeds to step 1604.

At step 1603, the setting management unit 240 determines the target of the halftone processing using a screen with a large number of lines to be all the attributes. Due to this, for example, in the case of the image as in FIG. 7, in which three kinds of object, i.e., image, graphic, and text, exist, the halftone processing using a screen with a large number of lines is performed on all these objects.

At step 1604, the setting management unit 240 determines the target of the halftone processing using a screen with a small number of lines to be the remaining attributes other than text. In the case of the present embodiment, the target of the halftone processing using a screen with a small number of lines is limited to only the objects of image attribute and graphic attribute. At this time, for the object of text attribute, it is determined that a screen with a number not a small number of lines (number of lines that does not cause jaggies) is applied. Due to this, for the character portion, the halftone processing using a screen with a comparatively large number of lines is performed, and therefore, it is possible to suppress the occurrence of jaggies.

At step 1605, the halftone processing unit 237 performs the halftone processing in accordance with the contents determined at S1603 or S1604 with a screen with the number of lines set at S1601 based on the attribute information on the input image data. In other words, in the case where "Large number of lines" is set, the halftone processing unit 237 performs the halftone processing using a screen with a large number of lines on the objects of all attributes. In the case where "Small number of lines" is set, the halftone processing unit 237 performs the halftone processing using a screen with a small number of lines on the objects of attributes other than text and performs the halftone processing using a screen with a comparatively large number of lines, with which it is known empirically that jaggies do no occur, on the object of text attribute. The above is the contents of the control of the halftone processing according to the present embodiment.

It is possible to specifically determine which number of lines to be "Small number of lines" by, for example, performing the halftone processing using screens with a variety of numbers of lines and by performing test printing of the generated halftone dot image data. Then, the number of screen lines that is applied to the object of text attribute may be determined appropriately by holding the results in the HDD 114 or the like.

In the present embodiment, in accordance with the setting contents of the number of screen lines to be used for the halftone processing, the portion (object attribute) where the set number of screen lines is used is determined. Due to this, for example, even in the case where a small number of lines is specified in order to stabilize the density of objects, such as photo and graphic, the small number of lines is not applied to character, and therefore, it is possible to prevent jaggies from occurring in the character portion. In this manner, it is possible to eliminate undesirable effects due to the simplification of the user interface for setting the number of screen lines to be used for the halftone processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to obtain a favorable image for which the attribute of each object being taken into consideration without the need to specify in detail various kinds of image processing to be applied to image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-126477, filed Jun. 24, 2015, which is hereby incorporated by reference wherein in its entirety.

What is claimed is:

1. An image processing apparatus comprising:
a user interface;
at least one of (a) a memory storing a program, and one or more processors which executes the program and (b) one or more circuits, wherein the at least one of (a) the memory storing the program, and the one or more processors which executes the program and (b) the one or more circuits causes the image processing apparatus to function as a control unit configured to:
(1) detect text included in input data;
(2) display, on the user interface, a plurality of levels lined up in an order to allow a user to select a level from a plurality of levels, wherein each level in a first portion of the plurality of levels is associated with sharpening and each level in a second portion of the plurality of levels is associated with smoothing, wherein the first portion is separate from the second portion; and
(3) sharpen the input data more intensely when a level in the first portion more away from the second portion is selected, and smooth the input data more intensely without smoothing the detected text when a level in the second portion more away from the first portion is selected.

2. An image processing apparatus comprising:
a setting unit configured to set a level related to sharpness from among multiple levels in a setting range;
a determining unit configured to determine a text area and an image area in input data; and
an image processing unit configured to sharpen or smooth the input data based on the level set at the setting unit, wherein the sharpening of the determined text area and the determined image area in the input data gets more intense when the set level is in one side of the setting range and gets closer to one end in the one side, and the smoothing of the determined image area in the input data gets more intense without the determined text area being subjected to the smoothing when the set level is in the other side of the setting range and gets closer to the opposite end in the other side.

3. The image processing apparatus according to claim 2, wherein in the one side, the end is the most away from the other side, and
wherein in the other side, the opposite end is the most away from the one side.

4. The image processing apparatus according to claim 2, wherein the setting range and the multiple levels are displayed, and
wherein the setting unit is configured to set the level based on a user selecting the level from among the displayed multiple levels.

5. The image processing apparatus according to claim 2, wherein the setting unit, the determining unit, and the image processing unit are implemented by one or more processors and/or one or more circuits.

6. An image processing apparatus comprising:
a user interface; and
at least one of (a) a memory storing a program, and one or more processors which executes the program and (b) one or more circuits, wherein the at least one of (a) the memory storing the program, and the one or more processors which executes the program and (b) the one or more circuits causes the image processing apparatus to function as a control unit configured to:
(1) display, on the user interface, a plurality of levels lined up in an order to allow a user to select a level from a plurality of levels, wherein each level in a first portion of the plurality of levels is associated with sharpening and each level in a second portion of the plurality of levels is associated with smoothing, wherein the first portion is separate from the second portion; and
(2) cause an image processing unit to sharpen the input data more intensely when a level in the first portion more away from the second portion is selected, and to smooth the input data more intensely without smoothing a text area in the input image when a level in the second portion more away from the first portion is selected.

7. An image processing apparatus comprising:
a setting unit configured to set a level related to sharpness from among multiple levels in a setting range; and
a causing unit configured to cause an image processing unit to sharpen or smooth the input data based on the level set at the setting unit, wherein the sharpening of a text area and an image area in the input data gets more intense when the set level is in one side of the setting range and gets closer to one end in the one side, and the smoothing of the image area in the input data gets more intense without the text area being subjected to the smoothing when the set level is in the other side of the setting range and gets closer to the opposite end in the other side.

8. The image processing apparatus according to claim 7, wherein in the one side, the end is the most away from the other side, and
wherein in the other side, the opposite end is the most away from the one side.

9. The image processing apparatus according to claim 7, wherein the setting range and the multiple levels are displayed, and
wherein the setting unit is configured to set the level based on a user selecting the level from among the displayed multiple levels.

10. The image processing apparatus according to claim 7, wherein the setting unit and the causing unit are implemented by one or more processors and/or one or more circuits.

11. An image processing system comprising:
a setting unit configured to set a level related to sharpness from among multiple levels in a setting range;
a determining unit configured to determine a text area and an image area in input data; and
an image processing unit configured to sharpen or smooth the input data based on the level set at the setting unit, wherein the sharpening of the determined text area and the determined image area in the input data gets more intense when the set level is in one side of the setting range and gets closer to one end in the one side, and the smoothing of the determined image area in the input data gets more intense without the determined text area being subjected to the smoothing when the set level is in the other side of the setting range and gets closer to the opposite end in the other side.

12. The image processing system according to claim 11, wherein in the one side, the end is the most away from the other side, and
wherein in the other side, the opposite end is the most away from the one side.

13. The image processing system according to claim 11, wherein the setting range and the multiple levels are displayed, and
wherein the setting unit is configured to set the level based on a user selecting the level from among the displayed multiple levels.

14. The image processing system according to claim 11, wherein the setting unit, the determining unit, and the image processing unit are implemented by one or more processors and/or one or more circuits.

15. An image processing method comprising:
setting a level related to sharpness from among multiple levels in a setting range;
determining a text area and an image area in input data; and
sharpening or smoothing the input data based on the level set at the setting unit, wherein the sharpening of the determined text area and the determined image area in the input data gets more intense when the set level is in one side of the setting range and gets closer to one end in the one side, and the smoothing of the determined image area in the input data gets more intense without the determined text area being subjected to the smoothing when the set level is in the other side of the setting range and gets closer to the opposite end in the other side.

16. The image processing method according to claim 15, wherein in the one side, the end is the most away from the other side, and
wherein in the other side, the opposite end is the most away from the one side.

17. The image processing method according to claim 15, wherein the setting range and the multiple levels are displayed, and
wherein the setting sets the level based on a user selecting the level from among the displayed multiple levels.

18. The image processing method according to claim 15, wherein the setting, the determining, and the sharpening or smoothing are implemented by one or more processors and/or one or more circuits.

* * * * *